US008560347B1

(12) United States Patent
Ali et al.

(10) Patent No.: US 8,560,347 B1
(45) Date of Patent: *Oct. 15, 2013

(54) METHOD AND SYSTEM FOR CALCULATING AN ALIGNMENT DATE FOR PRESCRIPTIONS

(75) Inventors: Syed Y. Ali, Chicago, IL (US); Amy C. Biesenthal, Buffalo Grove, IL (US); Greg Pankow, Morton Grove, IL (US); Deivasigamani K. Gounder, Wheeling, IL (US); Sean McGonagle, Buffalo Grove, IL (US)

(73) Assignee: Walgreen Co., Deerfield, IL (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/694,968

(22) Filed: Jan. 27, 2010

Related U.S. Application Data

(63) Continuation-in-part of application No. 12/275,891, filed on Nov. 21, 2008.

(60) Provisional application No. 61/147,698, filed on Jan. 27, 2009.

(51) Int. Cl.
G06Q 10/00 (2012.01)
G06F 7/60 (2006.01)
G06F 9/45 (2006.01)
G06F 19/00 (2011.01)
G06G 7/58 (2006.01)
A61B 5/00 (2006.01)

(52) U.S. Cl.
USPC .................. 705/3; 705/2; 705/11; 705/22

(58) Field of Classification Search
USPC ........................................ 705/2, 3
See application file for complete search history.

(56) References Cited

U.S. PATENT DOCUMENTS

| | | | | |
|---|---|---|---|---|
| 5,845,255 | A * | 12/1998 | Mayaud | 705/3 |
| 7,426,476 | B2 * | 9/2008 | Munoz et al. | 705/3 |
| 7,856,363 | B2 | 12/2010 | Palazzolo et al. | |
| 2008/0308445 | A1 | 12/2008 | Dolak | |
| 2009/0030719 | A1 | 1/2009 | Nadas et al. | |
| 2009/0030720 | A1 | 1/2009 | Nadas et al. | |
| 2009/0030725 | A1 * | 1/2009 | Nadas et al. | 705/3 |
| 2009/0043608 | A1 | 2/2009 | Nadas et al. | |
| 2009/0043610 | A1 | 2/2009 | Nadas et al. | |
| 2009/0043611 | A1 | 2/2009 | Nadas et al. | |

OTHER PUBLICATIONS

Salganie, M. William, "A Pill on Time Seems to Help the Bottom Line", Sep. 9, 2002, The Baltimore Sun, Business.
Office action for U.S. Appl. No. 11/781,926 dated Feb. 11, 2011.

(Continued)

*Primary Examiner* — Sean K Hunter
(74) *Attorney, Agent, or Firm* — Francis C. Kowalik; Marshall, Gerstein & Borun LLP; Randall G. Rueth

(57) ABSTRACT

A system and method facilitate alignment of refill dates associated with a plurality of prescriptions, such that each of the plurality of prescriptions requires a refill on the same date, thus limiting the number of occasions on which a customer must visit the pharmacy to retrieve refills of the aligned prescriptions, and increasing the likelihood that the customer will comply with the prescribed medication regimen. The system and method facilitate the alignment of the refill dates while complying with one or more rules governing the adjudication of the prescriptions.

20 Claims, 8 Drawing Sheets

(56) References Cited

OTHER PUBLICATIONS

U.S. Appl. No. 12/942,779, filed Nov. 9, 2010 entitled, "Method and System for Aligning a Plurality of Refill Dates for Prescriptions Associated with a Plurality of Customers."

U.S. Appl. No. 12/900,728, filed Oct. 8, 2010 entitled "Method and System for Delivering to a Customer a Plurality of Prescriptions Having Aligned Refill Dates."

U.S. Appl. No. 12/275,891, filed Nov. 21, 2008, on behalf of Pankow et al., entitled "Method and System for Enrolling in a Medication Compliance Packaging Program".

U.S. Appl. No. 11/781,938, filed Jul. 23, 2007, on behalf of Nadas et al., entitled "Method and System for Delivering to a Customer a Plurality of Prescriptions Having Aligned Refill Dates".

U.S. Appl. No. 11/926,817, filed Oct. 29, 2007, on behalf of Lewis, entitled "Method of Increasing Compliance of a Medication Within a Multi-Dose Blister Pack".

U.S. Appl. No. 12/276,053, filed Nov. 21, 2008, on behalf of Ali et al., entitled "Method and System for Calculating an Alignment Date for Prescriptions".

U.S. Appl. No. 12/276,073, filed Nov. 21, 2008, on behalf of Ali et al., entitled "Method and System for Aligning Prescriptions to a User-Selected Date".

U.S. Appl. No. 60/963,871, filed Aug. 31, 2006, on behalf of Nadas et al., entitled "Comprehensive Medication Management System".

U.S. Appl. No. 60/940,790, filed May 30, 2007, on behalf of McGonagle et al., entitled "Multi-Dose Filling Machine".

\* cited by examiner

METHOD AND SYSTEM FOR CALCULATING AN ALIGNMENT DATE FOR PRESCRIPTIONS

RELATED APPLICATIONS

This application claims priority under 35 U.S.C. §119(e) to U.S. Provisional Patent Application No. 61/147,698, entitled "METHOD AND SYSTEM FOR CALCULATING AN ALIGNMENT DATE FOR A PRESCRIPTION", filed Jan. 27, 2009, and also claims priority as a continuation-in-part under 35 U.S.C. §120 of U.S. patent application Ser. No. 12/275,891, entitled "METHOD AND SYSTEM FOR ENROLLING IN A MEDICATION COMPLIANCE PACKAGING PROGRAM", filed on Nov. 21, 2008, and the entirety of both applications is hereby incorporated herein by reference. U.S. patent application Ser. No. 12/275,891 incorporates by reference each of the following applications relating to and further describing various aspects of the embodiments disclosed in the present application, and each of which this application hereby incorporates herein by reference: U.S. patent application Ser. No. 11/781,926, entitled "SYSTEM AND METHOD OF PRESCRIPTION ALIGNMENT", and filed on Jul. 23, 2007; U.S. patent application Ser. No. 11/959,430, entitled "COMPREHENSIVE MEDICATION MANAGEMENT SYSTEM", filed on Dec. 18, 2007; and U.S. patent application Ser. No. 12/276,053, entitled "METHOD AND SYSTEM FOR CALCULATING AN ALIGNMENT DATE FOR PRESCRIPTIONS", filed on Nov. 21, 2008.

TECHNICAL FIELD

The present disclosure generally relates to a process for aligning fill dates for a plurality of prescription medications.

BACKGROUND

Generally, customers fill prescription medication orders (hereinafter, "prescriptions") on the day on which they are prescribed, or shortly thereafter. Because prescriptions may be written and filled at different times, and for different quantities of medication, it is common for a customer with multiple prescriptions to run out of the prescribed medications at varying times. Ordering and picking up refills for the various prescriptions at different times may be an inconvenience for a customer, for example, where the store location is not convenient, where a customer depends on others to pick up the prescription, or where a customer's schedule does not coincide with the pharmacy schedule. Additionally, many customers may be unable to remember multiple dates on which they must order or pick up prescription refills. This may affect the customer's health, as it may lead to missed or skipped doses of medication. Mail order and call-center-based services mitigate or alleviate some of these problems, but it is still incumbent on customers to remember to order the refills of their prescriptions. Various rules promulgated by third-parties, such as insurance companies or regulatory agencies, place restrictions on the periods during which a pharmacy may refill prescriptions or on the amount of medication that the pharmacy may dispense in a given time period, further complicating the situation.

DETAILED DESCRIPTION

Figure 1A:
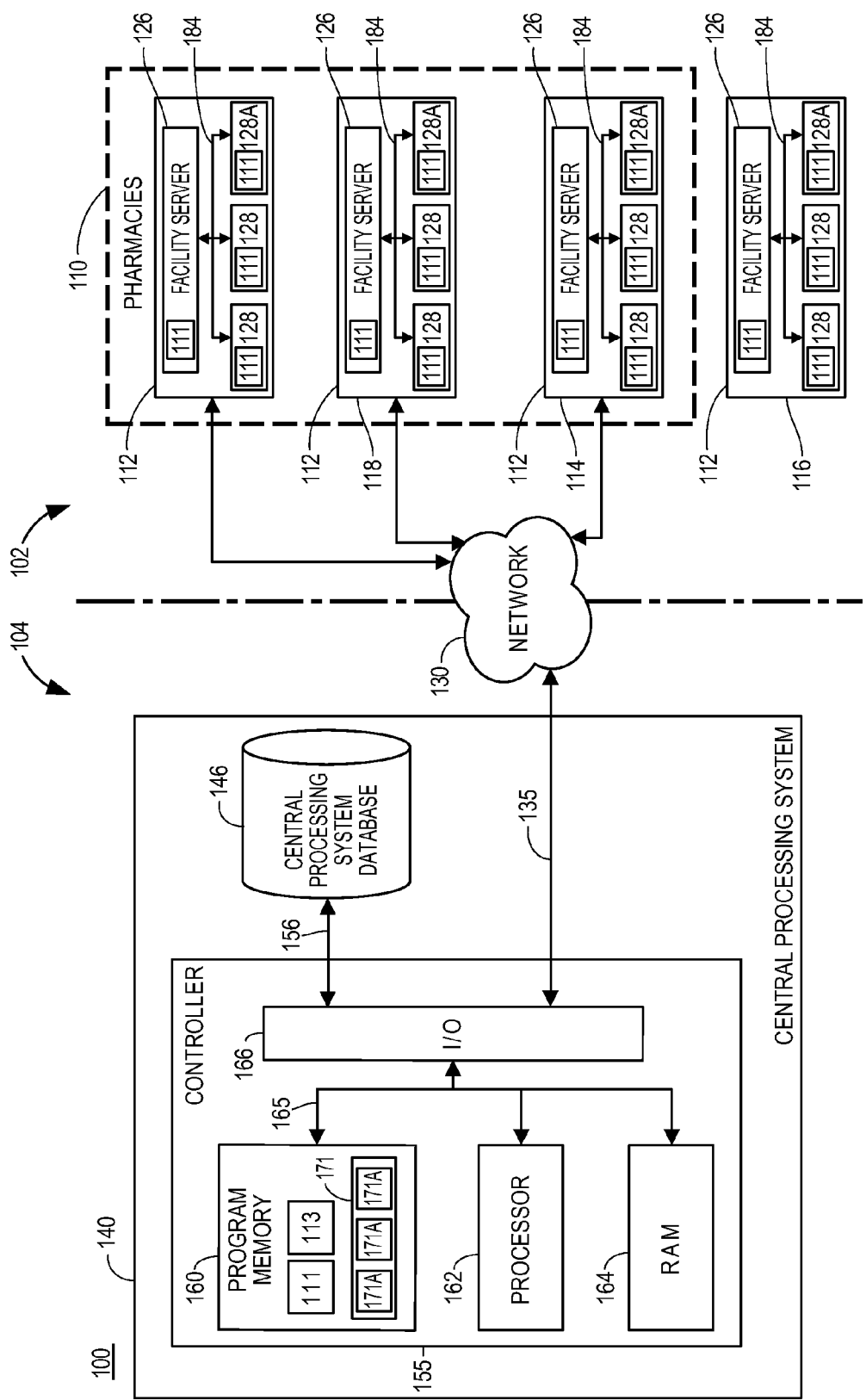
FIG. 1A illustrates a block diagram of a computer network and system on which an exemplary prescription alignment system may operate in accordance with the described embodiments.
Figure 1B:
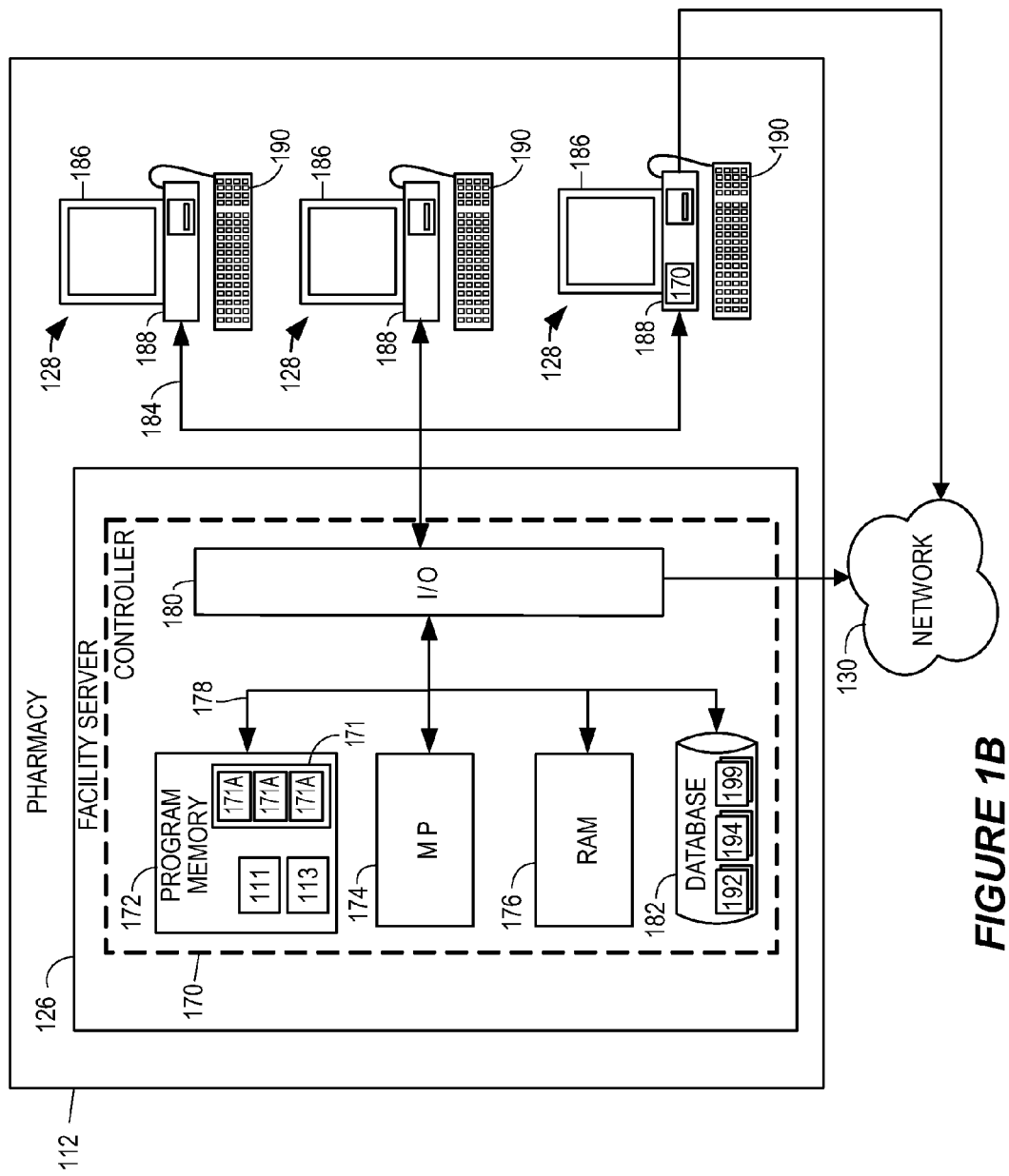
FIG. 1B illustrates a block diagram of a computer server and computer terminals on which an exemplary prescription alignment system may operate in accordance with the described embodiments.
Figure 1C:
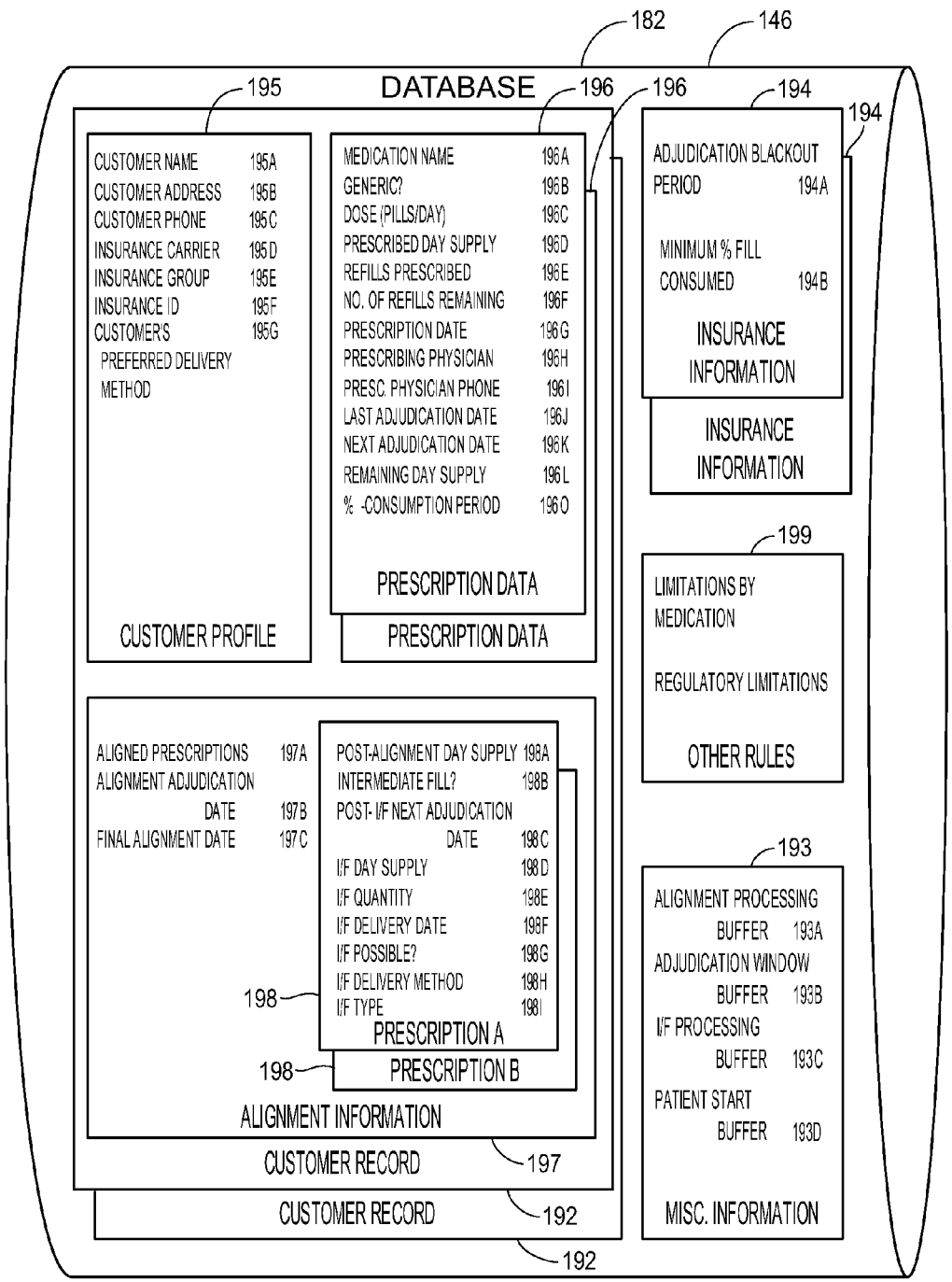
FIG. 1C depicts exemplary data in a database depicted in either of FIG. 1A or FIG. 1B, in accordance with the described embodiments.

FIGS. 1A, 1B, and 1C illustrate various aspects of an exemplary architecture implementing a prescription alignment system 100. In particular, FIG. 1A illustrates a block diagram of the exemplary prescription alignment system 100. The high-level architecture includes both hardware and software applications, as well as various data communications channels for communicating data between the various hardware and software components. The prescription alignment system 100 may be roughly divided into front-end components 102 and back-end components 104. The front-end components 102 are primarily disposed within a retail network 110 including one or more pharmacies 112. The pharmacies 112 may be located, by way of example rather than limitation, in separate geographic locations from each other, including different areas of the same city, different cities, or even different states. The front-end components 102 comprise a number of pharmacy workstations 128. The pharmacy workstations 128 are local computers located in the various pharmacies 112 throughout the retail network 110 and executing various pharmacy management-related applications. Pharmacists and other pharmacy personnel, referred to collectively herein simply as "pharmacists" (not shown), use the pharmacy workstations 128 to access customer information, enter new prescriptions, access insurance and payment information and so forth. Each of the pharmacies 112 may be, for example, an in-store retail pharmacy, an on-line pharmacy, a mail-order pharmacy, a long-term care pharmacy, a workplace/on-site pharmacy, or a specialty pharmacy. Retail network 110 may also include one or more warehouses or central-filling facilities 118. The warehouses or central-filling facilities 118 may distribute medications to the various retail pharmacies 112 in the retail network 110, or may distribute medications directly to customers. Of course, the pharmacy 112 may also be a stand-alone pharmacy 116 (i.e., not part of any retail network or chain).

As used herein, the term medication may be read to mean any substance that may be distributed by a pharmacy or by a pharmacist, including those substances that may be obtained without a prescription (i.e., "over the counter" substances such as vitamins). Thus, while the embodiments described herein contemplate the alignment of refills related to prescription medications, other substances (e.g., nutritional supplements, over-the-counter medications, etc.) may also be dispensed with one or more prescription medications. The refill of these other substances may likewise be aligned with one or more prescription medications. Of course, the methods described herein may also be used to align refills of two or more non-prescription substances with each other, even if none of the two or more non-prescription substances is aligned with a prescription medication.

Returning now to FIG. 1A, those of ordinary skill in the art will recognize that the front-end components 102 could also comprise a plurality of facility servers 126 and client device terminals 128A disposed at the plurality of pharmacies 112, instead of, or in addition to, a plurality of pharmacy workstations 128. Each of the pharmacies 112 may include one or more facility servers 126 that may facilitate communications between the client device terminals 128A and the back-end components 104 via a digital network 130, described below, and may store information for a plurality of customers/employees/accounts/etc. associated with each facility. Of course, a local digital network 184 may also operatively connect each of the workstations 128 to the facility server 126. Unless otherwise indicated, any discussion of the workstations 128 also refers to the facility servers 126 and the client device terminals 128A, and vice versa. Moreover, environments other than the pharmacies 112, such as the kiosks, call centers, and Internet interface terminals contemplated in U.S. patent application Ser. No. 11/781,926, entitled "System and Method of Prescription Alignment," filed Jul. 23, 2007, may employ the workstations 128, the client device terminals 128A, and the servers 126. As used herein, the term "pharmacy" refers to any of these points of contact (e.g., call centers, kiosks, Internet interface terminals, etc.) in addition to the retail pharmacies 112, warehouses 116, etc. described above.

The front-end components 102 communicate with the back-end components 104 via the digital network 130. The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. The back-end components 104 include a prescription alignment central processing system 140. The prescription alignment central processing system 140 may include one or more computer processors 162 adapted and configured to execute various software applications and components of the prescription alignment system 100, in addition to other software applications, such as a medication management system. The central processing system 140 further includes a database 146. The database 146 is adapted to store data related to the operation of the pharmacies 112 and the prescription alignment system 100. The central processing system 140 may access data stored in the database 146 when executing various functions and tasks associated with the operation of the prescription alignment system 100.

Although the prescription alignment system 100 is shown to include one prescription alignment central processing system 140 and four pharmacies 112, it should be understood that different numbers of computers and pharmacies may be utilized. For example, the digital network 130 may interconnect the system 100 to a plurality of included central processing systems 140 and hundreds of included pharmacies 112 within the retail network 110. According to the disclosed example, this configuration may provide several advantages, such as, for example, enabling near real-time uploads and downloads of information as well as periodic uploads and downloads of information. This provides for a primary backup of all the information generated in the process of updating and accumulating pharmacy data. Alternatively, some of the pharmacies 112, such as the pharmacy 116, may be separate from the digital network 130, storing the necessary data locally on the facility server 126 and/or the workstations 128.

FIG. 1A also depicts one possible embodiment of the central processing system 140. The central processing system 140 may have a controller 155 operatively connected to the database 146 via a link 156 connected to an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 through the I/O circuit 166.

FIG. 1B depicts one possible embodiment of the front-end components 102 located in one or more of the pharmacies 112 from FIG. 1A. Although the following description addresses the design of the pharmacies 112, it should be understood that the design of one or more of the pharmacies 112 may be different than the design of others of the pharmacies 112. Also, each of the pharmacies 112 may have various different structures and methods of operation. It should also be understood that while the embodiment shown in FIG. 1B illustrates some of the components and data connections that may be present in a pharmacy 112, it does not illustrate all of the data connections that may be present in a pharmacy 112. For exemplary purposes, one design of a pharmacy is described below, but it should be understood that numerous other designs may be utilized.

Each of the pharmacies 112 has one or more pharmacy workstations 128 and/or a facility server 126. The digital network 184 operatively connects the facility server 126 to the plurality of workstations 128 and/or to the client device terminals 128A. The digital network 184 may be a wide area network (WAN), a local area network (LAN), or any other type of digital network readily known to those persons skilled in the art. The digital network 130 may operatively connect the facility server 126, the workstations 128, and/or the client device terminals 128A to the central processing system 140.

Each workstation 128, client device terminal 128A, or facility server 126 includes a controller 170. Similar to the controller 155 from FIG. 1A, the controller 170 includes a program memory 172, a microcontroller or a microprocessor (MP) 174, a random-access memory (RAM) 176, and an input/output (I/O) circuit 180, all of which are interconnected via an address/data bus 178. In some embodiments, the controller 170 may also include, or otherwise be communicatively connected to, a database 182. The database 182 (and/or the database 146 of FIG. 1A) includes data such as customer records 192, insurer information records 194, and other rules 199 and miscellaneous information 193 (as depicted in FIG. 10). As discussed with reference to the controller 155, it should be appreciated that although FIG. 1B depicts only one microprocessor 174, the controller 170 may include multiple microprocessors 174. Similarly, the memory of the controller 170 may include multiple RAMs 176 and multiple program memories 172. Although the figure depicts the I/O circuit 180 as a single block, the I/O circuit 180 may include a number of different types of I/O circuits. The controller 170 may implement the RAM(s) 176 and the program memories 172 as semiconductor memories, magnetically readable memories, and/or optically readable memories, for example.

Either or both of the program memories 160 and 172 may also contain an alignment engine 171, for execution within the processors 162 and 174, respectively. The alignment engine 171 may perform the various tasks associated with the alignment method, and may be a single module 171A or a plurality of modules 171A. By way of example and not limitation, the alignment engine 171 or the modules 171A within the alignment engine 171 may: receive a selection of a plurality of prescriptions to align; determine a latest adjudication date from a plurality of calculated adjudication dates; calculate parameters associated with an intermediate-fill of a prescription, such as an intermediate-fill day supply, an intermediate-fill quantity, or an intermediate-fill delivery date; calculate a final alignment date for a plurality of prescriptions; retrieve information from the database 182 (or the database 146); calculate a parameter, such as a percent-consumption period, required to determine compliance with a rule determined by a third-party payor or a regulatory agency; calculate adjudication dates associated with one or more prescriptions; adjudicate one or more prescriptions; fill prescriptions; cause prescriptions to be shipped to the customer or to a retail location; etc. Each of the modules 171A may execute one or more of the various parts of the alignment method described below with reference to FIGS. 2A and 2B.

In addition to the controller 170, the workstations 128 and the client device terminals 128A may further include a display 186 and a keyboard 190 as well as a variety of other input/output devices (not shown) such as a scanner, printer, mouse, touch screen, track pad, track ball, isopoint, voice recognition system, digital camera, etc. A pharmacy employee may sign on and occupy each workstation 128 or client device terminal 128A to assist the pharmacy employee in performing his or her duties. Pharmacy employees may sign onto the workstation 128 or the client device terminal 128A using any available technique, such as entering a user name and password. If a pharmacy employee signs on to the system using a client device terminal 128A, the network 184 communicates this information to the facility server 126, so that the controller 170 may identify which pharmacy employees are signed onto the system 100 and which workstation 128 or client device terminal 128A the employee is signed onto. This may be useful for record keeping and/or monitoring the pharmacy employees' productivity as well as in record-keeping.

Various software applications resident in the front-end components 102 and the back-end components 104 implement the prescription alignment methods, and provide various user interface means to allow users (i.e., pharmacists and/or customers) to access the system 100. One or more of the front-end components 102 and/or the back-end components 104 may include a user-interface application 111 for allowing a user, such as the pharmacist or customer service representative, to input and view data associated with the system 100. In some embodiments, the user-interface application 111 is a web browser client, and the facility server 126 or the central-processing system 140 implements a server application 113 for providing data to the user-interface application 111. However, the user-interface application 111 may be any type of interface, including a proprietary interface, and may communicate with the facility server 126 or the central processing system 140 using any type of protocol including, but not limited to, file transfer protocol (FTP), telnet, hypertext-transfer protocol (HTTP), etc. Moreover, the user interface application 111 may be running on one of the workstations 128 in a pharmacy 112 (as when the pharmacist is accessing the system) or may be running on an Internet interface terminal (not shown) (as when a customer is requesting and configuring alignment of the customer's prescriptions). The information sent to the workstations 128 and to the client device terminals 128A from the facility server 126 and/or the central processing system 140 includes data retrieved from the database 146 and/or the database 182. The central processing system 140 and/or the facility server 126 may implement any known protocol compatible with the user-interface application 111 running on the workstations 128 and the client device terminals 128A and adapted to the purpose of receiving and providing the necessary customer information via the digital network 130 and/or the digital network 184.

For purposes of implementing the prescription alignment system 100, the primary point of contact with the customer is through the pharmacy 112. As used herein, the term "customer" may be, by way of example, a patient (i.e., the person named on the prescription), a guardian (e.g., the parent of a child named on the prescription), a care-giver (i.e., anyone who takes care of a patient or picks up the medication on the patient's behalf), etc. Moreover, the term "customer" is not limited to a single person, but may instead be any person or persons having a reason to align a group of prescriptions. For example, a customer could be a care-giver responsible for various patients, for which caregiver it would be convenient to align prescriptions for the various patients so as to avoid having to order and/or retrieve prescription refills on an overwhelming number of dates. Or, for example, a customer could be a family wherein multiple family members have prescriptions which, if aligned, would reduce the burden of ordering and/or retrieving the various medications prescribed to the family members. In any event, while the term "customer" is used interchangeably with the term "patient," in this specification the term "customer" is used primarily so as to avoid confusion. Thus, a customer may be a patient (as where a person picks up his/her own prescriptions), but a customer may also be, by way of example, a parent picking up a prescription for a child (i.e., a guardian), a husband picking up a prescription for his wife, a home-care nurse picking up a prescription for one or more patients, a care facility director (or other personnel) picking up prescriptions for one or more patients, etc. Also, as mentioned above, the pharmacy 112 may be any of the channels through which the entity implementing the prescription alignment system 100 serves its pharmacy customers. Thus, the pharmacy 112 may be a retail pharmacy 112 in the customer's neighborhood (or any other drug store in a drug store chain), an on-line pharmacy or an on-line interface to a pharmacy 112 or to a retail network 110 (where the customer uses a web-browser to communicate with the server application 113), a phone/touch-tone interface to a pharmacy 112 or to a retail network 110 (where the customer uses a phone service to communicate with the server application 113), a mail-order pharmacy, a central-filling facility, a specialty pharmacy, or any other type of pharmacy affiliated with the entity implementing the prescription alignment system 100. In some embodiments, a pharmacist, other pharmacy staff, or a customer service representative (all referred to herein simply as "the pharmacist") invokes the prescription alignment system 100 while interacting with a customer at a pharmacy 112 or over the telephone (e.g., from a retail pharmacy 112, or a call center). The pharmacist will have access to one of the pharmacy workstations 128 or to one of the client device terminals 128A and may invoke the prescription alignment system 100 when he or she fills the customer's prescription. In another embodiment, the customer invokes the prescription alignment system 100 (e.g., at a kiosk, via an Internet interface terminal, on a mail-in form, etc.). Alternatively, the prescription alignment system 100 may be invoked automatically for each new prescription entered (e.g., by reminding the pharmacist to ask whether the customer would like to align his or her prescriptions) or by a broader system, such as a medication management system.

As described above, one or both of the databases 146 and 182, illustrated in FIGS. 1A and 1B, respectively, include various information about the pharmacy's customers and the prescriptions filled by the pharmacy, as well as various business information including, but not limited to, information associated with third-party payors (e.g., insurance companies), employee information, and the like. FIG. 10 depicts some of the exemplary data that the system 100 may store on the databases 146 and 182. The databases 146 and/or 182 contain a customer record 192 for every customer who purchases his/her medication at one of the pharmacies 112 (or via a call center, website, etc.). The customer record 192 contains important information about the customer and the various pharmacy services that have been invoked by, or on behalf of, the customer in a customer profile 195. The customer profile 195 includes basic biographical information about the customer, such as a customer name 195A, a customer address 195B, a customer phone number 195C, an insurance carrier 195D associated with the customer, an insurance group number 195E for the customer, an insurance ID number 195F for the customer, a preferred delivery method 195G, etc. Additionally, the customer profile 195 may include other information such as credit card information or other payment information, one or more customer e-mail addresses, user name and/or password information, online security question/answer information, etc. Of course, the customer record 192 may also include other or less information than that described.

The customer record 192 also includes prescription data 196 for each prescription filled by the pharmacy for the customer. The prescription data 196 generally include, but are not limited to: a name 196A of the medication; an indication 196B whether a generic may be substituted; a dose (i.e., pills per day) 196C of the medication; a number of days of medication to be dispensed (also referred to herein as a "day supply" or a "prescribed day supply") 196D; a number of refills prescribed 196E; a number of refills remaining 196F; a prescription date 196G; a prescribing physician 196H; a phone number 196I for the prescribing physician; a date on which the prescription was most recently adjudicated (also referred to herein as a "last adjudication date") 196J; a calculated date on which the prescription may next be adjudicated (also referred to herein as a "next adjudication date") 196K for the prescription; a remaining day supply 196L for the prescription; and a percent-consumption period 196O indicating the number of days it would take to consume the required minimum percent-fill consumed 194B of the fill for the prescription). Of course, the prescription data 196 need not include all of the information above, such as when the system 100 determines some information (e.g., the next adjudication date 196K) but does not store it, or stores it some place other than with the prescription data 196 in the database 146 or the database 182. Moreover, the prescription data 196 may include additional information not mentioned above.

Additionally, the customer record 192 includes alignment information 197. The alignment information 197 generally includes information related to the final alignment of the prescriptions, including, in part, a list of prescriptions selected for alignment 197A, an alignment adjudication date 197B, and a final alignment date 197C. Additionally, the alignment information 197 includes, for each of the prescriptions selected for alignment, information 198 specific to the alignment of the prescription. For example, aligning the plurality of selected prescriptions may require adjusting the day supply for one fill (an "intermediate-fill") for each of one or more of the selected prescriptions by, for example, dispensing more of the medication ("overfilling") or less of the medication ("underfilling" or "short-filling") such that the customer exhausts the supply of a first medication at the same time as the supply of a second medication. Any refill of a prescription that occurs between the current date and the final alignment date 197C is referred to herein as an "intermediate-fill," regardless of whether the fill is a short fill, a long fill, or a full fill (i.e., a refill of the prescribed day supply 196D). Each intermediate fill may have an associated post intermediate-fill next adjudication date 198C, an associated intermediate-fill day supply 198D, indicating the number of days of medication dispensed, etc. The information 198 includes, for each prescription, a post-alignment day supply 198A (indicating for the medication the day supply to be dispensed on or around the alignment adjudication date and, presumably, for each refill thereafter), an indication 198B of whether the prescription requires an intermediate-fill, the post intermediate-fill next adjudication date 198C, the intermediate-fill day-supply 198D, an intermediate-fill quantity 198E, an intermediate-fill delivery date 198F, an indication 198G of whether an intermediate fill is possible, a preferred delivery method 198H, and an intermediate fill type 198I, indicating whether the intermediate fill is a short fill, a long fill, or a full fill. Of course, the alignment information 197, including the information 198, may, in some embodiments, include more or less information than described above. Additionally, the alignment information 197 may vary over time. For example, when a customer adds a new medication, the alignment information 197, including the final alignment date 197C, may change to accommodate the newly prescribed medication. Moreover, in some circumstances (e.g., where there are no applicable adjudication rules), it may be possible to deliver all of any required intermediate-fills on the same date and, therefore, the intermediate-fill delivery date 198F for each required intermediate fill could be the same.

The database 182 and/or the database 146 may also include rules related to the filling and/or re-filling of prescriptions. In particular, records 193 include generically applicable information related to the alignment process, described with reference to FIGS. 2A and 2B, records 194 include rules promulgated by third-party payors (i.e., insurance companies), and records 199 include prescription limitations (i.e., limitations placed on a prescription by a physician or a drug manufacturer), and other rules (e.g., regulations related to specific drugs) that may place limitations on the when, and how often, a customer refills a prescription, or how much of the prescribed medication the customer receives. These limitations complicate the alignment process by constraining various aspects of the refill process and, in many instances, delay the final alignment date 197C of prescription refills.

Third parties promulgate the majority of the rules discussed above, which rules relate specifically to the adjudication of the prescription (i.e., making a claim to the insurance company for the particular prescription) and, in particular, how often and when adjudication may occur. For example, a rule may state that sufficient time should have elapsed after adjudication for the customer to consume some percentage of the prescribed day supply. This "minimum percent-fill consumed" could be stored as a record 194B in the database 182 or the database 146. Thus, for a medication prescribed with a 30-day supply, 23 days must elapse after the adjudication for the prescription if the adjudication rules for the particular insurance company (i.e., the minimum percent-fill consumed 194B) require that sufficient time elapse for the customer to consume 75% of the medication prior to adjudication the prescription again. The minimum percent-fill consumed 194B may vary based on the prescribed medication, the filling pharmacy, the third-party payor, the medical facility, the prescribed day supply, the customer, etc. Alternatively, or additionally, adjudication rules promulgated by a third-party payor may require that a minimum number of days elapse between two adjudications for a particular prescription. This information may be stored in a record 194A in the database 182 or the database 146. Such an "adjudication blackout period" 194A might, for example, require four, five, or even ten days between adjudications of a prescription. Another possible rule, promulgated by either a third-party payor or by a regulatory agency, may limit the amount of a medication (e.g., the number of tablets) dispensed to a customer by the pharmacy in a specific period of time.

Figure 2A:
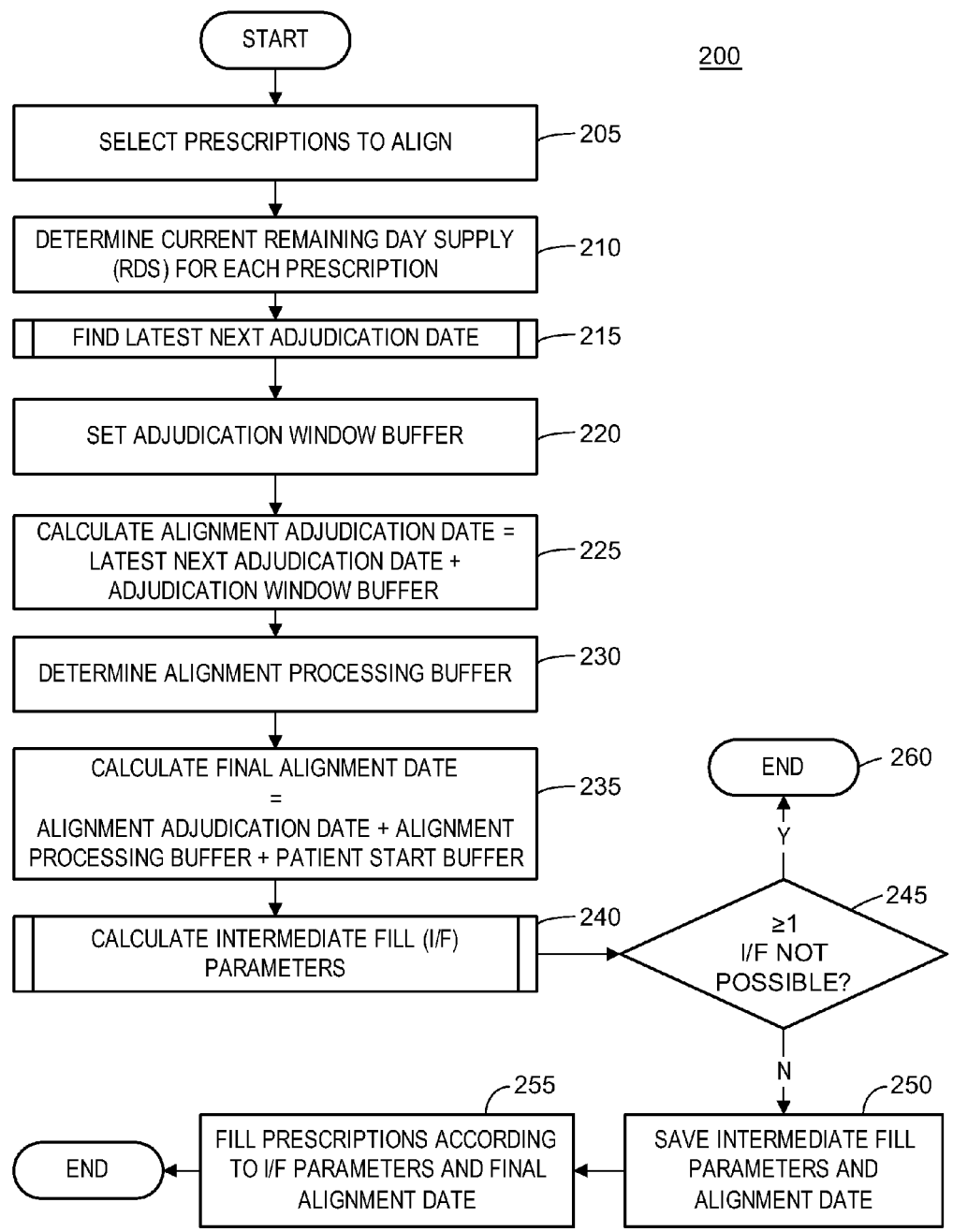
FIG. 2A illustrates an exemplary process for aligning the refill dates of a plurality of prescriptions to a calculated date in accordance with the described embodiments.

FIG. 2A illustrates an exemplary method 200 for efficiently aligning a plurality of prescription refill dates. The method 200 may begin when a user (e.g., the pharmacist, a call center operator, a customer accessing the service via the Internet, etc.) of the system 100 selects two or more prescriptions, which prescriptions' refill dates the customer wants aligned (block 205). The prescriptions selected in block 205 typically correspond to a single patient and a single customer record 192, and each selected prescription typically prescribes a maintenance medication (i.e., a medication taken regularly by the patient over an extended period of time). Of course, there is no reason that the selected prescriptions could not be for multiple patients (e.g., multiple patients under the care of a single caregiver, multiple family members, etc.) and it is conceivable that non-maintenance medications (including non-prescription medications) could be aligned with maintenance medications.

The system 100 determines the remaining day supply 196L for each of the selected prescriptions (i.e., how many days the remaining medication will last) (block 210). In some embodiments, the system 100 determines the remaining day supply 196L of each medication by calculating how much medication should remain, based on the last time the customer received a refill (or based on the last adjudication date 196J), the current date, and the prescribed day supply 196D. In other embodiments, the pharmacist asks the customer, for each selected prescription, how much of the medication remains. In any event, the system 100 may store the remaining day supply 196L with the prescription data 196 in the customer record 192. In most instances, the selected prescriptions will be prescriptions already filled by the customer at least once. However, it is possible for the selected prescriptions to include a newly-prescribed prescription. Where a newly-prescribed prescription is among the selected prescriptions, the remaining day supply 196L for that prescription may be the prescribed day supply 196D for that prescription if the prescription will be filled as prescribed. However, a newly-prescribed prescription may also be short-filled or long-filled as part of the alignment process, in which case the remaining day supply 196L could be set to zero for the purposes of the intermediate-fill calculations described below.

Of course, a newly-prescribed prescription could also be aligned with a plurality of already-aligned prescriptions. That is, two or more previously-aligned prescriptions could be selected in addition to one or more newly-prescribed prescriptions with the goal of aligning all of the selected prescriptions to the same date. Alignment of the prescriptions could be accomplished by aligning all of the prescriptions to a new date by treating the previously-aligned prescriptions as though they had not been previously aligned. Alternatively, alignment of the prescriptions could be accomplished by maintaining the alignment parameters of the previously-aligned prescriptions, and aligning the new prescription(s) to the same date as the previously-aligned prescriptions. Of course, at least one intermediate fill (which may be a short fill, a long fill, or a full fill) may be required for the new prescription prior to alignment of the new prescription with those previously aligned.

In any event, having determined, at block 210, the remaining day supply 196L for each of the selected prescriptions, the system 100 proceeds to determine the next adjudication date 196K for each of the selected prescriptions, and then to determine the latest of those next adjudication dates among the selected prescriptions (block 215).

The latest of the next adjudication dates is the date on which a pharmacy could adjudicate all of the selected prescriptions and, in the absence of other considerations (e.g., adjudication blackout periods 194A related to intermediate fills, discussed below), the latest of the next adjudication dates determined at block 215 would be the alignment adjudication date 197B (i.e., the date on which all of the prescriptions selected for alignment would be adjudicated). The customer would receive the selected prescriptions on the delivery date and would presumably consume the first of the medications one or more days after delivery (i.e., the final alignment date 197C).

Unless otherwise specified, the term "delivery," as used above and as used throughout this specification, refers to the customer's taking receipt of the prescribed medication(s). Thus, the prescribed medications may be delivered to the customer at the customer's home, work, or other provided address (e.g., where the medications are mailed, shipped, or couriered directly to the customer) or may be delivered to the customer at another location, such as a retail pharmacy 112 (e.g., where the medication is picked up by the customer). Throughout this specification, the terms "shipped," "shipping," and "ship" refer to any methods that may include a lead time including, but not limited to, mailing (e.g., via U.S. Post Office), shipping (e.g, via UPS or FedEx), etc.

Figure 3:
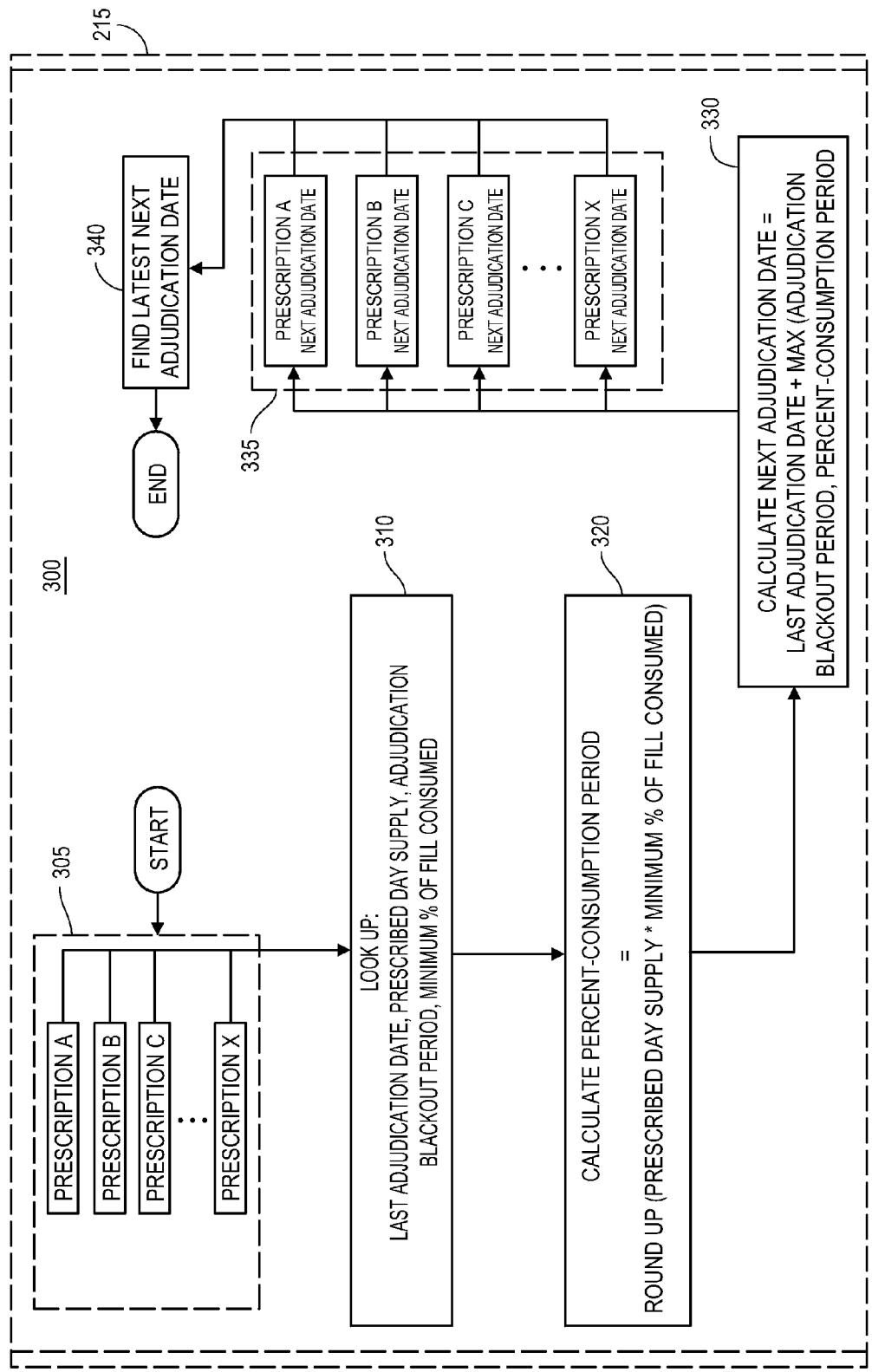
FIG. 3 illustrates an exemplary process for finding a latest adjudication date in accordance with the exemplary process illustrated in FIGS. 2A and 2B.

FIG. 3 illustrates an exemplary method 300 of finding the latest of the earliest next adjudication dates, the method 300 corresponding to the block 215 of FIG. 2A. The method 300 starts with the plurality of prescriptions selected for alignment. For each prescription, the system 100 retrieves various information (block 310). The information retrieved in the block 310 includes the last adjudication date 196J for the prescription, the prescribed day supply 196D for the prescription, the adjudication blackout period 194A, and the minimum percent-fill consumed 194B prior to the next adjudication. Of course, the system 100 may retrieve the various information from one or more customer records 192, or from various other records 194 or 199 in the database 146 or the database 182, and the information may be stored on, and retrieved from, a local storage location or a remote storage location (such as the database 146 or the database 182) accessed via the digital network 130 or the digital network

184. Moreover, the information retrieved in the block 310 may include more information or less information than described above. For example, an insurance company may not have an adjudication blackout period 194A, in which case the block 310 would not include retrieving the adjudication blackout period 194A.

Having retrieved the information in the block 310, the system 100 determines a percent-consumption period 196O (i.e., the number of days necessary for the customer to consume a required percentage of the current fill for the prescription, assuming, of course, that the customer does not skip any doses) (block 320). The block 320 illustrated in FIG. 3 shows one method of determining the percent-consumption period 196O. The number of days it takes to consume the required minimum percent-fill consumed 194B of the fill for the prescription determines the percent-consumption period 196O. For example, suppose a prescription prescribes a 30-day supply of a medication, and that a third-party payor requires that sufficient time elapse for the customer to consume 77% of the prescription before adjudicating the prescription for refill. 77% of 30 days is 23.1 days (i.e., 30*0.77=23.1). Rounding up, 24 days must elapse for the customer to have consumed 77% of the medication. In this case, the percent-consumption period 196O is 24 days. In some cases, the rules may allow rounding down, in which case 23 days must elapse for the customer to have consumed 77% of the medication.

As described above, the various rules that third-parties promulgate may include not only a minimum percent-fill consumed 194B, but may also include an "adjudication blackout period" 194A (i.e., a rule requiring a minimum period of time between adjudications of a prescription). The larger of the adjudication blackout period 194A and the percent-consumption period 196O will determine the next adjudication date 196K for the prescription. The system 100 calculates the next adjudication date 196K for the prescription using the last adjudication date 196J and the larger of the adjudication blackout period 194A and the percent-consumption period 196O (block 330). Using the method 300, the system 100 calculates the next adjudication date 196K for the prescription by adding the larger of the adjudication blackout period 194A and the percent-consumption period 196O (determined at block 320) to the last adjudication date 196J. Continuing with the example above, if the last adjudication date 196J for a prescription is July 1, the adjudication blackout period 194A is 6 days, and the percent-consumption period 196O, determined at block 320, is 24 days, the next adjudication date 196K on which adjudication for the prescription may occur is July 25 (24 days after the last adjudication on July 1).

When the system 100 has performed the operations illustrated in blocks 310 through 330 for each of the prescriptions, each of the prescriptions will have associated with the corresponding data 196 a next adjudication date 196K (block 335). The system 100 then selects the latest of the next adjudication dates 196K (block 340). Thus, if the next adjudication dates 196K for three prescriptions were July 13, July 17, and July 20, the system 100 would select July 20 as the latest adjudication date.

Of course, in some instances, such as where a customer does not have insurance coverage for medication or where none of the medications are covered by a customer's insurance (e.g., the dispensed medications are all vitamins), there may be no rules applicable to the dispensed medications at all. In these instances, the adjudication rules (e.g., the adjudication blackout period 194A or the minimum percent-fill consumed 194B) may be set to zero, or the blocks calculating associated parameters (e.g., the block 320) may be omitted entirely. In other instances, such as when the pharmacy does not charge the customer for an intermediate fill, when the customer pays cash for an intermediate fill instead of making a claim on his or her insurance, or when the third-party payor allows the adjudication rules to be waived, the adjudication rules (e.g., the adjudication blackout period 194A or the minimum percent-fill consumed 194B) may be set to zero for the intermediate fills (or the associated blocks omitted), but adjudication rules may still apply to the non-intermediate-fill deliveries of medication. In still other instances, the system 100 may determine that one or more prescriptions requiring an intermediate fill would, if the intermediate fill were adjudicated, cause the final alignment date to be delayed (e.g., where the next adjudication date after the intermediate fill adjudication would not provide sufficient time to deliver to the aligned medications to the customer before the calculated or selected alignment date). In these instances, the system 100 may select the prescription (or prescriptions, if there are more than one prescription), the intermediate fill of which would delay the alignment date and avoid the adjudication of the prescription (e.g., by providing the intermediate fill to the customer for free, by charging the customer cash, etc.).

In some instances, though, the customer will exhaust his or her supply of one or more of the medications prescribed by the selected prescriptions prior to the latest adjudication date determined at block 215 or, in any event, prior to the final alignment date 197C. In such an instance, the customer will require a refill of one or more of the selected medications before the final alignment date 197C in order to avoid missing any doses and may receive an intermediate fill that contains less than the prescribed day supply 196D of the medication, or may receive an intermediate fill that contains more than the prescribed day 196D of the medication, depending on the final alignment date 197C. Of course, filling the prescription, even with an intermediate fill, may restart the adjudication period for that prescription and create a post intermediate-fill next adjudication date 198C for that prescription. In some cases (e.g., where the pharmacy does not charge the customer for the intermediate fill or where the customer pays cash for the intermediate fill instead of billing an insurance company), adjudication rules would not apply and, therefore, the adjudication period would not restart. In other cases, the post intermediate-fill next adjudication date 198C (i.e., the next adjudication date after the intermediate fill) may not fall until after the latest adjudication date determined at block 215 (i.e., a post intermediate-fill next adjudication date 198C will be after the latest adjudication date).

Referring again to FIG. 2A, the system 100, employing method 200, then addresses situations where the latest adjudication date determined at block 215 requires one or more intermediate fills, which intermediate fills may cause post intermediate-fill next adjudication dates 198C for the intermediate-filled prescriptions to fall after the latest adjudication date (block 220). In some embodiments, the method 200 addresses this situation simply by determining an adjudication window buffer 193B sufficient to ensure that all of the selected prescriptions may be adjudicated at some common point subsequent to the latest adjudication date determined at block 215. For example, the adjudication window buffer 193B may be set to three days, four days, ten days, 20 days, 30 days, etc. In this manner, the adjudication window buffer 193B allows sufficient time to elapse, after adjudication of a prescription for the purpose of an intermediate fill, so that the prescription may be adjudicated again on whatever date is selected as the final alignment date. In other embodiments employing method 200, the adjudication window buffer 193B may not be utilized, in which case it may be set to zero days or the step may be excluded.

Using method 200, the system 100 next determines an alignment adjudication date 197B (block 225). The alignment adjudication date 197B is the date on which the system 100 will adjudicate all of the selected prescriptions for the final alignment. In embodiments employing a simple adjudication window buffer 193B, the method 200 includes calculating the alignment adjudication date 197B by adding the adjudication window buffer 193B determined at block 220 to the latest adjudication date determined block 215.

Regardless of the method by which the system 100 determines the alignment adjudication date 197B, the alignment adjudication date 197B is the date on which all of the selected prescriptions may be adjudicated and is not necessarily the final alignment date 197C. This is because additional time related to the processing of the prescription may further delay the date on which the customer receives the prescribed medication. Adjudication of the prescription, filling the prescription, shipping the prescribed medication, and delivery time may all delay the date on which the customer receives the prescribed medication. For example, if the adjudication process takes place near the end of the business day, it may be too late to ship the prescribed medications, even if the pharmacy 112 or the central-filling facility 114 fills the prescriptions on the same day as adjudication. Once the pharmacy 112 or the central-filling facility 114 ships the selected prescriptions, the shipping process could take anywhere from one day to five days or more, depending on the carrier, the relative locations of the pharmacy 112 and the customer, the weather, and various other factors. Moreover, additional processes, such as printing blister packages for aligned prescription medications, may extend the time elapsing between adjudication of the prescription by the pharmacy 112 and delivery to the customer.

Alternatively, "delivery" of the prescriptions to the customer could be accomplished in person (i.e., the customer could pick the prescriptions up at a retail pharmacy). Thus, while some embodiments described herein contemplate delivery of prescriptions to the customer by some form of shipping or courier service, the term "deliver," as used within this application, means to provide the medication to the customer. For example, the prescription alignment system 100 contemplated herein could also "deliver" prescriptions to a customer when the customer comes to the pharmacy to pick up the prescriptions. In such instances, various blocks of method 200 may be modified or omitted where necessary. Some of the necessary modifications and/or omissions are indicated, where appropriate, in the following paragraphs.

The system 100 then determines an alignment processing buffer 193A, which accounts for the time consumed by the various events occurring between the alignment adjudication date 197B and the final alignment date 197C (block 230). For example, the system 100 (or the person or persons programming the system 100) may allot one day for adjudication of the prescription and printing of a blister pack, one day for filling and shipping the selected prescriptions to the customer, and two days for delivery. Or, for example, the system 100 may allot one day for adjudication of the prescription and printing of a blister pack, one day for filling and shipping the selected prescriptions to a retail pharmacy 112, and two days for delivery to the customer (i.e., two days for the customer to pick up the prescription from the retail pharmacy 112). If desired, the system 100 may add additional time (e.g., one day, two days, etc.) as a buffer, to account for unexpected transportation delays and the like. Of course, each of these numbers may be any number selected to reflect the processes utilized in the particular system 100. Thus, the alignment processing buffer 193A is a variable and may be set depending on the patient, the prescription, the order, or other factors such as the method of delivery. For example, if the prescriptions are filled and delivered to the customer at a retail pharmacy 112 (i.e., if the customer picks up the prescriptions) the alignment processing buffer 193A would not include time for shipping, but may account for delays by the customer in stopping at the retail pharmacy 112 to pick up the prescriptions. Alternatively, if the prescriptions are filled at a central-filling facility 114 and shipped to the pharmacy 112 for the customer to pick up, the alignment processing buffer 193A could include the time for shipping. Some embodiments may require retrieving the alignment processing buffer 193A from a storage location, such as the database 146 or the database 182 at the block 230. Still other embodiments are envisioned which omit the block 230 entirely, such as, for example, embodiments in which the selected prescriptions are adjudicated, filled, and delivered to the customer in a single day, for example by filling the prescriptions at a retail pharmacy 112 and having the customer pick up the prescriptions or by delivering the prescriptions by courier.

The system 100 next determines the final alignment date 197C (block 235). The final alignment date 197C is the alignment adjudication date 197B determined at block 225, incremented by the alignment processing buffer 193A (determined at block 230) and by a patient start buffer 193D. The patient start buffer 193D allows one or more days for the patient to begin consuming the medication. For example, in some embodiments, the patient start buffer 193D is one day. The additional day accounts for the fact that the customer will likely not start consuming the medication until the day following delivery (by retail pick-up or shipping receipt) of the prescriptions. Of course, the additional day is not required and some embodiments may choose to set the final alignment date 197C to the alignment adjudication date 197B incremented by the alignment processing buffer 193A, omitting the extra day.

Figure 2B:
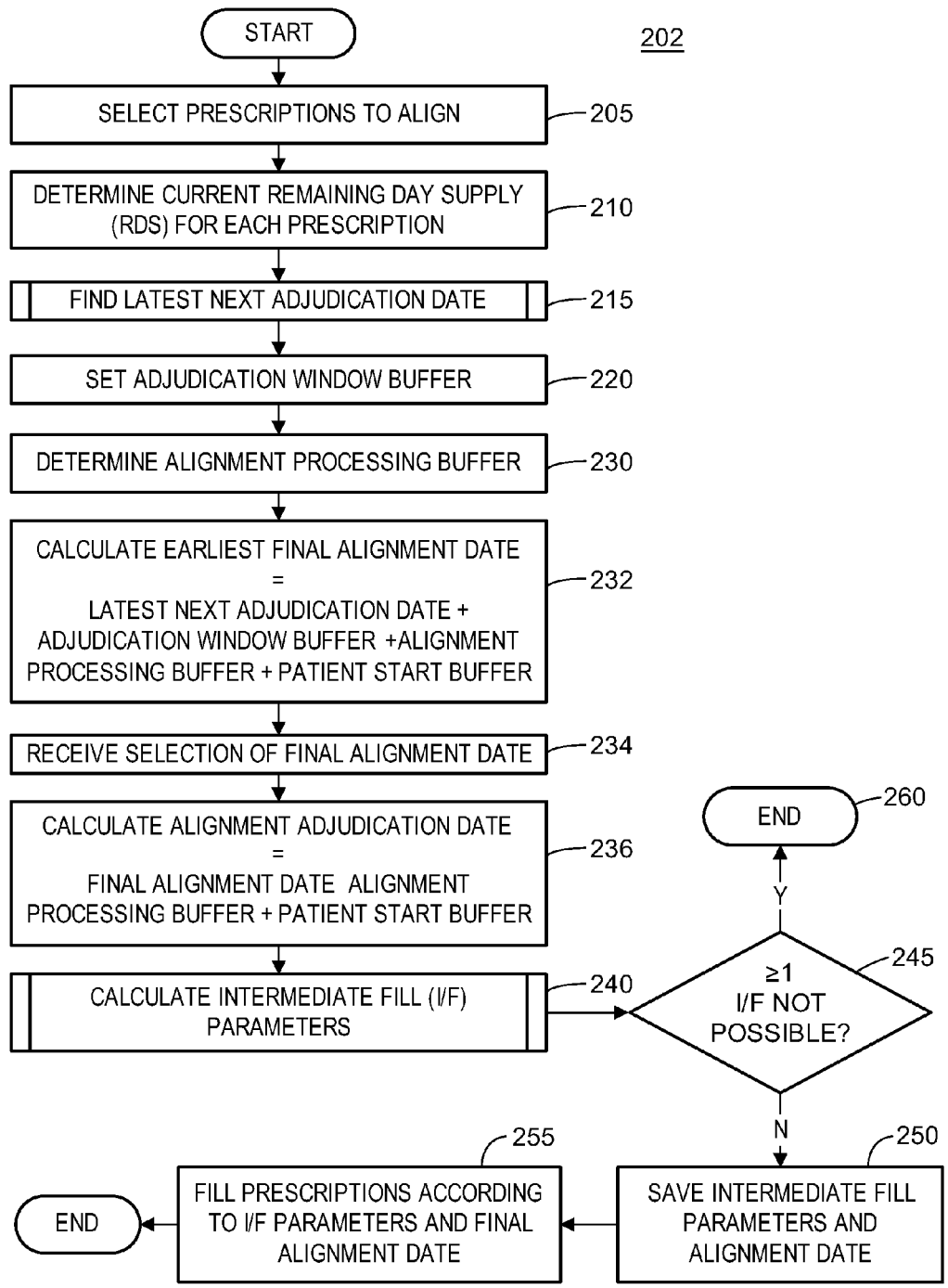
FIG. 2B illustrates an exemplary process for aligning the refill dates of a plurality of prescriptions to an arbitrary date, in accordance with the described embodiments.

Of course, the final alignment date 197C could also be chosen arbitrarily. For example, a customer may choose to align a plurality of prescriptions such that the alignment or adjudication dates for the prescriptions fall on, around, or after a certain day of the month (e.g., after they get paid, on a day on which they have a personal assistant, etc.). FIG. 2B illustrates a method 202 for aligning the plurality of prescriptions to an arbitrary date, rather than to a calculated date, as accomplished by the method 200 depicted in FIG. 2A. The system 100 initiates the method 202 in the same manner as the system 100 initiates the method 200, and proceeds, in the same manner as in the method 200, to select prescriptions to align (block 205), determine the day supply remaining 196D for each prescription (block 210), find the latest adjudication date for each prescription (block 215), and set the adjudication window buffer 193B (block 220).

However, after setting the adjudication window buffer 193B (block 220), the system 100 proceeds in method 202 to determine the alignment processing buffer 193A (block 230). Once the system 100 determines both the alignment processing buffer 193A and the adjudication window buffer 193B, the system 100 calculates the earliest final alignment date that the customer (or other user of the system 100) may select. The system 100 calculates the earliest final alignment date by adding to the latest adjudication date (determined at the block 215) a number of days equivalent to the sum of the adjudication window buffer 193B, the alignment processing buffer 193A, and the patient start buffer 193D (block 232). For example, if the latest adjudication date for a plurality of selected prescriptions were August 19, and the alignment processing buffer 193A, adjudication window buffer 193B, and patient start buffer 193D, were three days, five days, and one day, respectively, the earliest final alignment date that a customer or user could select would be August 28. Of course, circumstances may exist in which any of the various buffers 193A, 193B, 193D, etc. may be set to zero.

After determining the earliest final alignment date (block 232), the system 100 receives a selection of a final alignment date 197C (block 234). The final alignment date 197C must be on or after the earliest final alignment date (determined at block 232). Once the system 100 has received the selection of a final alignment date 197C (block 234), the system 100 calculates the alignment adjudication date 197B (block 236) that will result in the selected final alignment date 197C. The system 100 calculates the alignment adjudication date 197B by subtracting from the selected final alignment date 197C (received at block 234) a number of days equal to the alignment processing buffer 193A plus the patient start buffer 193D.

Additionally, the system 100 and, in particular, the alignment engine 171 may also implement other methods of aligning the selected prescriptions. In some embodiments, the alignment engine 171 cooperates with a cost determination module (not shown) to calculate alignment parameters resulting in the lowest alignment cost to the customer. One such cost determination module is disclosed in co-filed U.S. patent application Ser. No. 12/694,974, entitled "METHOD AND SYSTEM FOR CHARGING CUSTOMERS FOR PRESCRIPTION ALIGNMENT". In another embodiment, the alignment engine 171 calculates alignment parameters resulting in lowest cost to the pharmacy 112 or the retail network 110. In still another embodiment, the alignment engine 171 calculates alignment parameters resulting in alignment with the least number of intermediate fills.

In some instances, it may be desirable to align the selected prescriptions to a particular one of the prescriptions. This may be the case where, for example, one of the selected prescriptions is for a medication, such as an inhaler, that is not in pill form. An inhaler cannot be short filled or long filled because the inhaler includes a predetermined (and fixed) number of metered doses. Thus, where an inhaler is among the selected prescriptions, it may be desirable to align the remainder of the selected prescriptions with the prescription for the inhaler. However, even where all of the prescriptions are in pill form, it may still be desirable to align the selected prescriptions to a particular one of the prescriptions. For example, birth control pills are in pill form, but are frequently dispensed in packaging which, in terms of alignment, is similar to the case of the inhaler in that the packaging does not allow for short fills or long fills.

Of course, in some situations it may be possible to allow some amount of pre-packaged medication in the package, such as in an inhaler, to go to waste in order to facilitate alignment, rather than requiring other selected prescriptions to align to the pre-packaged medication. As an example, consider three prescriptions selected for alignment and having the same prescribed day supply 196D, and including an inhaler (sufficient metered doses for 30 days), birth control pills (pre-packaged in a 30-day package), and a third medication dispensed as individual pills (e.g., 30 pills in a vial). The third medication may, using an intermediate fill, be aligned to either the inhaler or the birth control pills, but the inhaler and the birth control pills cannot likely be aligned. One solution is to allow some of the inhaler contents to go unused and force alignment to the birth control pills. Even if the prescriptions for the two pre-packaged medications do not have the same prescribed day supply 196D (e.g., the inhaler includes sufficient metered doses for 30 days and the birth control pills are in a package having a 28-day supply), it may take a very long time for the two prescriptions to align and the customer may prefer to allow some of the inhaler contents to go unused and force alignment to the birth control pills.

In any event, after the system 100 determines the final alignment date 197C at block 235 of the method 200 (or at blocks 232-236 of the method 202), the system 100 calculates the parameters of any required intermediate fills (block 240). As described above, each intermediate fill may consist of a short fill, a long fill, or a full fill of the medication. For example, if a calculated final alignment date for a group of selected prescriptions is far enough in the future, aligning the refill dates of the selected prescriptions may require one or more full fills of one or more of the other selected prescriptions, in addition to a short fill of the one or more of the other selected prescriptions and/or a long fill of one or more of the other selected prescriptions. This would be the case where, for example, one of the selected prescriptions was recently filled with a 90-day supply, and the others of the selected prescriptions are each for 30-day supplies. Even if the alignment adjudication date 197B were the same as the next adjudication date 196K for the prescription having the 90-day supply (as would be the case for earliest possible final alignment date 197C), each of the medications having a 30-day supply would require at least one intermediate fill before the alignment date 197C. Depending on the next adjudication dates 196K of each of the prescriptions having a 30-day supply, a single short fill, one or more full fills and a short fill, or a single long fill may provide the customer with a sufficient quantity of medication so that the customer does not exhaust the supply of the medication before the final alignment date 197C. Thus, as an alternative to providing one or more 30-day full fills and possibly a short fill for each of the selected prescriptions that has a 30-day supply, the pharmacy could provide a long fill (or a full fill, where the next adjudication date 196K falls on the same day as the alignment adjudication date) for each of the prescriptions having the shorter prescribed day supply.

A long fill may also be utilized to achieve the same result as the adjudication window buffer 193B. The use of a long fill for an intermediate fill eliminates any issues related to adjudication rules triggered by an intermediate fill such as a short fill. Take, for instance, the situation where the latest next adjudication date falls 29 days from the current date, but one of the prescriptions selected for alignment has a remaining day supply 196L of two days. Assuming a two-day patient start buffer 193D, a three-day alignment processing buffer 193A, and no adjudication window buffer 193B, the final alignment date 197C would be 34 days from the current date. The prescription having the remaining day supply 196L of two days would require a full fill (a 30-day supply) in one day (so that the customer could start consuming the medication the following day), and a short fill of a two-day supply at the next adjudication date 196K. The alignment adjudication 197B might then be delayed because the short fill triggers the adjudication rules. It is for this reason that the methods 200 and 202 add an adjudication buffer to the latest next adjudication date to determine the alignment adjudication date. However, as an alternative to providing a full fill and a subsequent short fill, the pharmacy could provide a long fill of a 32-day supply if the payor rules allow and the pharmacy is able to do so. In addition to eliminating the need for the adjudication window buffer 193A (i.e., delaying the final alignment date 197C) in the above example, doing so would eliminate the cost associated with one of the fills (e.g., one copay for the long fill instead of two copays for the full fill and the short fill), could reduce the cost of alignment for the pharmacy (e.g., time spent filling on prescription instead of two, one inventory movement rather than two, etc.), and could reduce costs to a third-party payor by having to process one less transaction (e.g., one adjudication instead of two).

Figure 4:
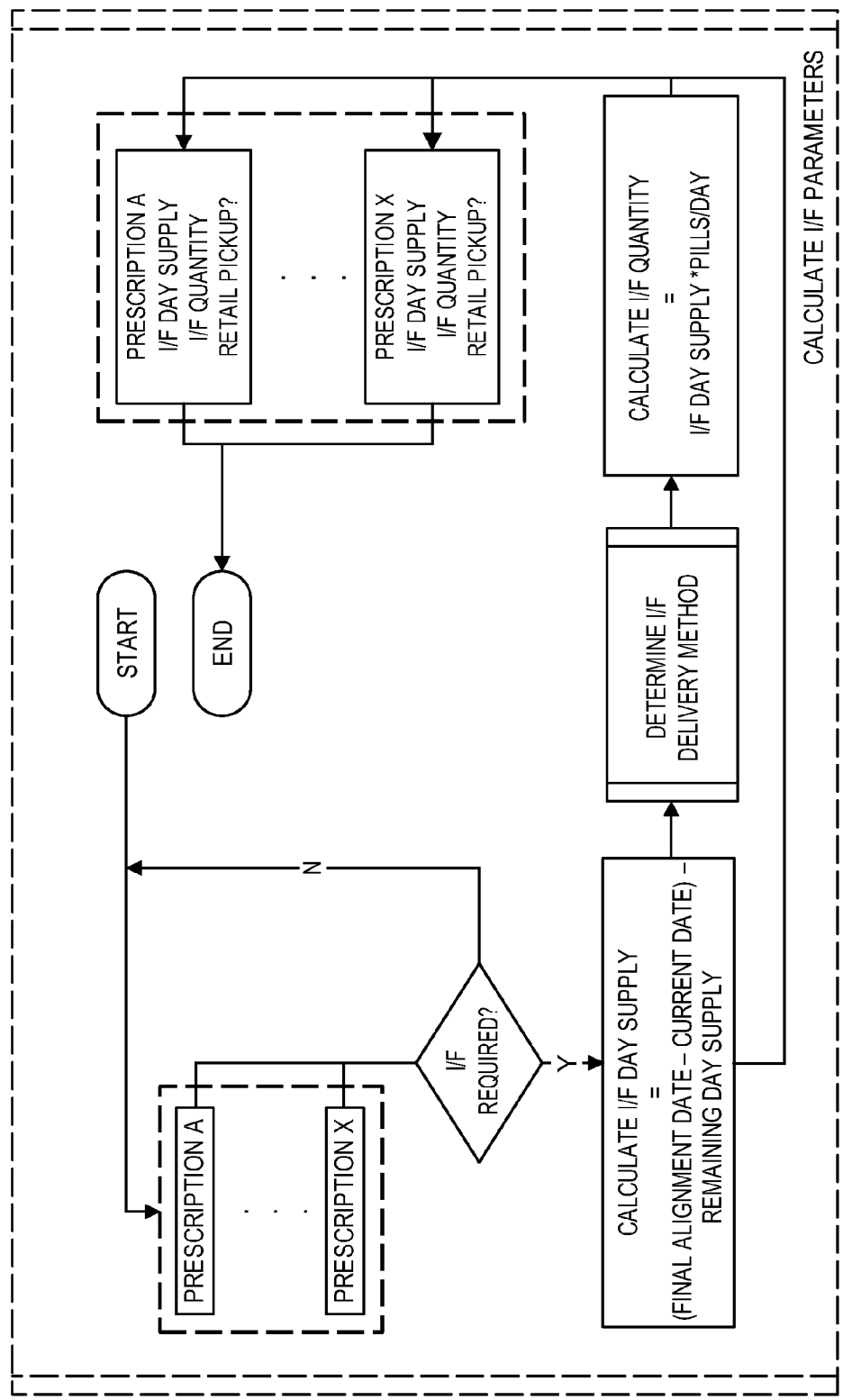
FIG. 4 illustrates an exemplary process for calculating a plurality of intermediate-fill parameters in accordance with the exemplary process illustrated in FIGS. 2A and 2B.

FIG. 4 illustrates a method 400, corresponding to block 240 of the methods 200 and 202, for determining the parameters of any intermediate fills. The method 400 starts with the plurality of selected prescriptions. The method 400 determines, for each of the selected prescriptions, whether the prescription requires an intermediate fill in order for the customer to have sufficient medication to last until the final alignment date 197C without skipping or missing any doses (block 405). To determine whether an intermediate fill is required for a selected prescription, the system 100 determines, based on the remaining day supply 196L, whether the customer has sufficient medication to last until the final alignment date 197C. For each prescription that does require an intermediate fill, the system 100 calculates an intermediate-fill day-supply 198D for the prescription (i.e., how many days of medication must be supplied to provide the customer with sufficient medication to get to the final alignment date 197C) (block 410). The system 100 determines the intermediate-fill day-supply 198D for the prescription by finding the difference between the remaining day supply 196L (determined at block 210 of the method 200) and the number of days between the final alignment date 197C (determined at block 235 of the method 200) and the current date. For example, if the final alignment date 197C is August 28, and the current date is July 14, the number of days between the final alignment date 197C and the current date is 45. If the method 200 determined that the customer has six days of medication left at block 210, the intermediate-fill day-supply 198D for the prescription, calculated by the method 200 at block 410, would be 39 days. That intermediate-fill day-supply 198D of 39 days could represent a short fill (if the prescription has a prescribed day supply 196D of 60 days), a long fill (if the prescription has a prescribed day supply 196D of 30 days), or a combination of a full fill and a short fill (if the prescription has a prescribed day supply 196D of 30 days).

Next, the system 100 determines whether an intermediate-fill is possible and, if so, determines the intermediate-fill delivery method 198H and the intermediate-fill delivery date 198F for the prescription (block 415). The details of these determinations are described below with reference to FIG. 5. In any event, if the system determines at block 415 that an intermediate fill is possible, the system 100 calculates the intermediate-fill quantity 198E (i.e., the number of pills to dispense in the intermediate fill) by multiplying the intermediate-fill day-supply 198D for the prescription (determined at block 410) by the prescribed dose (e.g., how many pills/day) 196C for the prescription (block 470). The results of the calculations and determinations performed at blocks 410, 415, and 470 are associated with each of the prescriptions.

Figure 5:
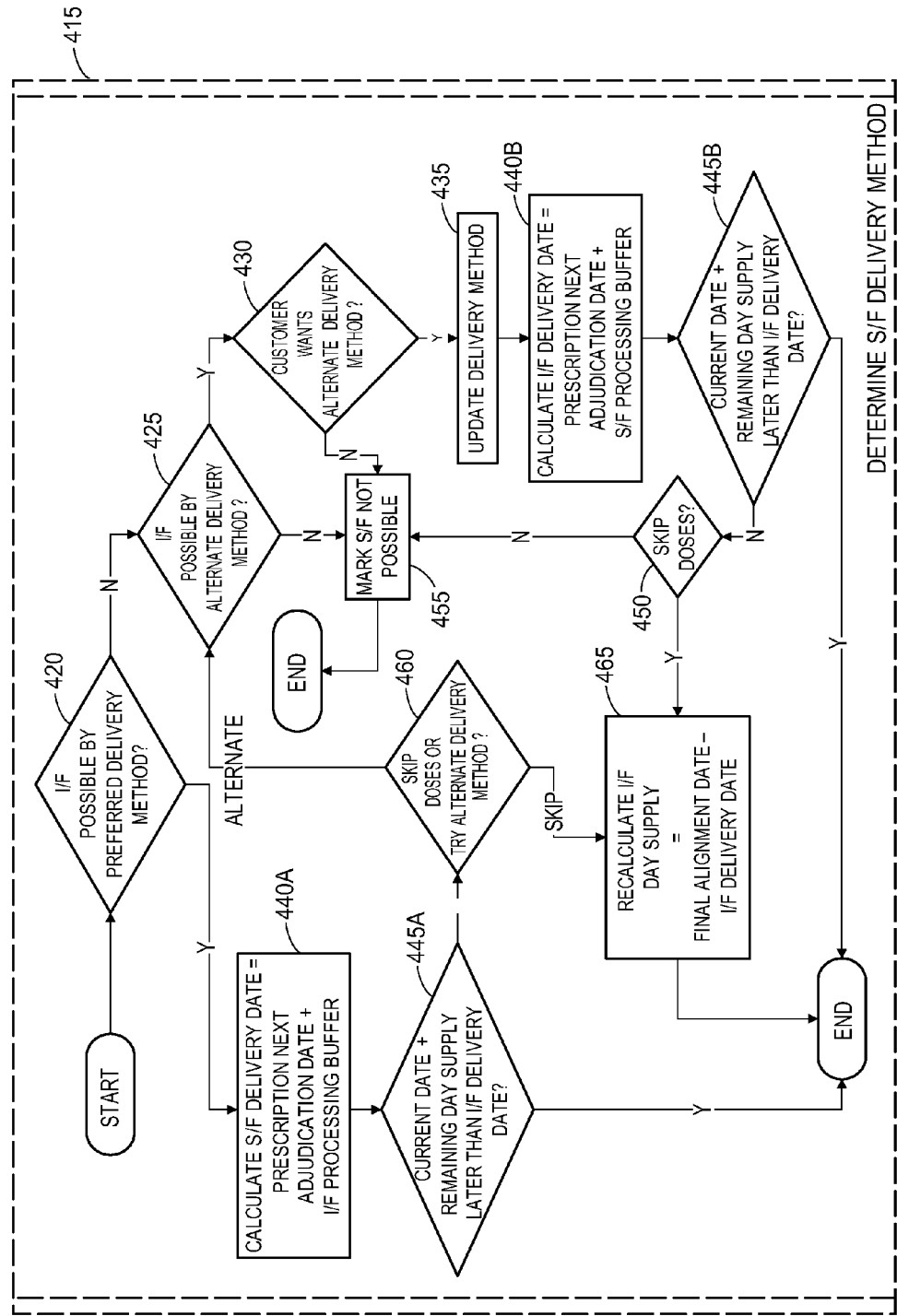
FIG. 5 illustrates an exemplary process for determining an intermediate-fill delivery method in accordance with the exemplary process illustrated in FIG. 4.

FIG. 5 depicts the block 415 in greater detail. The system 100 retrieves the customer's preferred delivery method 195G stored in the customer profile 195, and determines whether the preferred delivery method (e.g., store pick-up, shipped to customer, etc.) can accommodate an intermediate-fill for the medication (block 420). If the customer's preferred delivery method can accommodate an intermediate-fill for the medication, the system 100 calculates the intermediate-fill delivery date 198F for that method by adding to the next adjudication date 196K for the prescription, the number of days indicated by the intermediate-fill processing buffer 193C (block 440A). The intermediate-fill processing buffer 193C may, in some embodiments, be dependent on the particular delivery method employed, the patient, the prescription, the order, or any number of other factors. For example, the intermediate-fill processing buffer may be longer if the delivery method includes shipping a prescription from a warehouse or a central-filling facility to a customer or to the pharmacy than it would be if the delivery method includes filling the prescription at a local store and having the customer pick it up from the store.

After calculating the intermediate-fill delivery date 198F (at block 440A) the system 100 determines, based on the intermediate-fill delivery date 198F, whether the customer can receive the intermediate fill before exhausting the supply of medication (block 445A). If the intermediate-fill delivery date 198F indicates that the medication will arrive before the customer exhausts his or her supply of medication (as indicated by the remaining day supply 196L) (i.e., if the current date incremented by the remaining day supply 196L is later than the intermediate-fill delivery date 198F), then the system 100 stores the information and proceeds to calculate the intermediate-fill quantity (block 470). If, on the other hand, the intermediate-fill delivery date 198F indicates that the medication will not arrive before the customer exhausts his or her supply of medication, the system 100 (or a pharmacist acting in accordance with the system 100) may inquire as to whether the customer prefers to skip doses and take delivery using the preferred method or try an alternative method (block 460). For example, if the customer's preferred delivery method 195G is shipping, but shipping the intermediate fill of the prescribed medication to the customer would result in the intermediate fill arriving after the customer has exhausted the remaining day supply 196L, the customer may be asked if he or she can take delivery of the intermediate fill at a retail pharmacy location 112.

If the customer prefers to take delivery using the preferred delivery method 198H for the intermediate fill type 198I, even if this means skipping doses, the system 100 recalculates the intermediate-fill day supply 198D by finding the difference between the final alignment date 197C and the intermediate-fill delivery date 198F (block 465). If, on the other hand, the customer indicates at the block 460 a preference to try an alternative method for delivery or if, at the block 420, intermediate fill is not possible using the preferred delivery method, the system 100 evaluates whether the intermediate fill is possible using an alternate delivery method (block 425). If the intermediate fill is not possible by an alternate delivery method, the system 100 creates an indication 198G that the intermediate fill is not possible (block 455). Likewise, if the intermediate fill is possible using an alternate delivery method (block 425) but the customer refuses the alternate delivery method (block 430), the system 100 creates an indication 198G that the intermediate fill is not possible (block 455).

If, for the intermediate fill type 198I, the intermediate fill is possible by an alternate delivery method (block 425) and the customer wants to accept delivery via the alternate method (block 430), the system 100 updates an intermediate-fill delivery method 198H (which would otherwise be the same as the customer's preferred delivery method 195G) for the prescription (block 435). Next, the system 100 calculates the intermediate-fill delivery date 198F for the alternate delivery method by adding to the next adjudication date 196K for the prescription, the number of days indicated by the intermediate-fill processing buffer 193C (block 440B). Of course, the intermediate-fill processing buffer 193C may be different for the alternate delivery method than for the preferred delivery method.

After calculating the intermediate-fill delivery date 198F for the alternate delivery method (at block 440B), the system 100 determines, based on the intermediate-fill delivery date 198F, whether the customer can receive the intermediate fill before exhausting his or her supply of medication (block 445B). If the intermediate-fill delivery date 198F indicates that the medication will arrive before the customer exhausts the supply of medication (as indicated by the remaining day supply 196L) (i.e., if the current date incremented by the remaining day supply 196L is later than the intermediate-fill delivery date 198F), then the system 100 stores the information and proceeds to calculate the intermediate-fill quantity (block 470). If, on the other hand, the intermediate-fill delivery date 198F indicates that the medication will not arrive before the customer exhausts the supply of medication, the system 100 (or a pharmacist acting in accordance with the system 100) may inquire as to whether the customer prefers to skip doses, taking delivery using either the preferred or an alternate method (preferably the method resulting in the least number of missed doses), or recalculate the final alignment (block 450). If the customer prefers to skip doses, the system 100 recalculates the intermediate-fill day supply 198D by finding the difference between the final alignment date 197C and the intermediate-fill delivery date 198F (block 465). If, on the other hand, the customer does not want to skip any doses, the system 100 creates the indication 198G that the intermediate fill type 198I is not possible for the prescription (block 455).

Of course, the system 100 need not, in all embodiments, offer an alternate delivery method or the opportunity to skip doses. In some embodiments, if the type of intermediate fill is not possible by the preferred delivery method for the type of intermediate fill, or if the intermediate fill will not be delivered to the customer before the customer exhausts the supply of medication, the system 100 creates the indication 198G that the intermediate fill is not possible. In another embodiment, the system 100 automatically attempts to fulfill an intermediate fill by an alternate delivery method if the preferred method would result in the customer exhausting the supply of the medication before the intermediate fill could be delivered by the customer's preferred method. Additionally, the system 100 may, in some embodiments, offer multiple alternate delivery methods. In such embodiments, the system may proceed, after determining that one alternate delivery method is not possible (block 425) or determining that the customer does not want the alternate delivery method (block 430) or determining that the customer does not want to skip doses (block 450), to try an additional alternate delivery method by determining whether delivery of the intermediate fill is possible using yet another alternate delivery method (block 425). Where there are multiple alternate delivery methods available, the system 100, in some embodiments, gives the patient the option of prioritizing the alternate delivery methods or, in any event, indicating a preference for one over another. In another embodiment, the system 100 prioritizes the alternate delivery methods.

In any event, after the system 100 calculates an intermediate-fill delivery date 198F and possibly a recalculated intermediate-fill day supply 198D (block 415), the system calculates an intermediate-fill quantity 198E as described above (block 470). If, at block 415, the system 100 determines that the intermediate fill is not possible (indication 198G), the system 100 may skip the step of calculating the intermediate-fill quantity 198E.

Referring once again to FIG. 2A, after calculating the intermediate-fill parameters (block 240) the system 100 determines whether the records 198 for any of the prescriptions contain an indication 198G that the intermediate fill is not possible for that prescription (block 245). If none of the prescriptions are marked indicating that the intermediate fill is not possible, the system 100 saves the intermediate-fill parameters 198B-198H calculated at block 240 and the final alignment date 197C calculated at block 235 (block 250). The system 100 causes the prescriptions to be filled in accordance with the intermediate fill parameters 198B-198H and the final alignment date 197C (block 255). For example, the system 100 may cause one or more orders to be generated at appropriate times such that a pharmacist fills the prescription or prescriptions in time for delivery to the customer.

If the system 100 determines, at block 245, that the records 198 for one or more of the prescriptions contain an indication 198G that the intermediate fill is not possible, control passes to a block 260. As described above, a record 198 may include an indication 198G that a prescription cannot receive the desired type of intermediate-fill because the preferred method of delivery cannot accommodate that type of intermediate fill (e.g., short fills or long fills) or because that type of intermediate fill, delivered by the preferred method, will not arrive before the patient exhausts the supply of the medication. There could be other reasons why an intermediate fill is not possible as well. For example, a particular third-party payor may not allow short fills and/or long fills, or the filling pharmacy (or warehouse or central filling location) may be temporarily out of stock of the medication. Whatever the reason, when a prescription record 198 indicates that a particular type of intermediate fill is not possible, the pharmacy will, if possible, dispense an alternate type of intermediate fill (e.g., a full fill of the prescribed day supply 196D), perhaps with an alternate delivery method (e.g., by having the customer take delivery of the medication at their local or usual pharmacy). Of course, this may mean that the system 100 must recalculate the parameters calculated for the alignment process in the previous blocks of the method 200.

In most instances where both long fills and short fills are permitted (e.g., by third-party payors, government regulations, etc.), the system 100 will succeed in aligning the selected prescriptions using some combination of long fills, short fills, and full fills, and any prescriptions marked as having an intermediate fill that is not possible will result from being unable to deliver an impending refill, using any of the methods through which short fills and/or long fills could be delivered, before the patient has exhausted the remaining day supply of the medication. For example, an intermediate fill might include an indication 198G that an intermediate fill is not possible in a situation where short fills and long fills are only available through a central filling facility and no available delivery option will result in the customer receiving the intermediate fill before exhausting the remaining day supply 196L of the medication.

In some embodiments, delivery of prescriptions using the alignment system 100 occurs primarily by shipping the medications directly to the customer from one of the retail locations 112 or from a warehouse or central-filling facility 114, and the retail locations 112 may also deliver intermediate fills related to prescription alignment to the customer by having the customer pick up the intermediate fills of medication. This allows a customer to receive an intermediate fill of a prescribed medication even where the intermediate-fill delivery date 198F for the primary delivery method (i.e., shipping the prescription to the customer) is later than the next adjudication date 196K for the prescription. In such embodiments, the method 200 may omit block 245, as there may be no reason to evaluate whether any of the intermediate fill prescription records 198 include an indication 198G that the intermediate fill is not possible. Where block 245 is omitted, control passes directly from the block 240 to the block 255, at which block the prescriptions requiring intermediate fills are filled according to the intermediate fill parameters 198B-198H, and all of the selected prescriptions are filled according to the final alignment date 197C.

In other alternate embodiments, there are no rules limiting the adjudication of the selected prescriptions (i.e., the adjudication blackout period 194A and the percent-consumption period 196O are each zero). In these embodiments, the system 100 calculates the next adjudication date 196K for each of the prescriptions at block 330, and then determines the latest adjudication date among the selected prescriptions (at block 340). Of course, if the adjudication blackout period 194A and the percent-consumption period 196O are each zero, then the next adjudication date 196K may be any date, and in such a case the next adjudication date 196K may be calculated using other information. For example, the next adjudication date 196K may be calculated by determining when the customer will next need a refill of the medication. In any event, the latest adjudication date 196K among the selected prescriptions is the alignment adjudication date 197B, and the pharmacy 112 begins the process of adjudicating, filling, and shipping (or otherwise delivering) the prescription a number of days before the final alignment date 197C. The number of days is preferably the same as the alignment processing buffer 193A.

In some instances, the number of prescriptions selected for alignment and the timing of the various refills for the prescriptions may be such that the aligning all of the prescriptions would mandate a final alignment date that is at a relatively later date than desired. However, it may be possible that an earlier alignment date could be achieved while still accommodating alignment of a relatively high percentage (e.g., 90%) of the selected prescriptions, and then adding the remaining non-aligned prescriptions (e.g., the remaining 10%) to the alignment at a later date.

Further, various embodiments may allow for optimization of the alignment parameters and, in particular, the types of intermediate fills, according to a number of factors. The factors include at least the cost to the patient, the cost to the payor, the cost to the pharmacy or the retail network, how much medication may be wasted, and the availability of various delivery options.

The alignment engine 171 may additionally accommodate other scenarios. For example, as indicated above, the alignment engine 171 may cooperate with a cost determination module (not shown) to determine the least expensive alignment of the selected prescriptions. The cost determination module and the alignment engine 171 may cooperate to find the alignment (including the types of intermediate fills) that is least expensive to the customer, and may alternatively cooperate to find the alignment that is least expensive to the third-party payor. Additionally, the third-party payor may dictate the alignment date and/or the intermediate fill types in some embodiments and, in some embodiments, the third-party payor may require or prefer a single shipment for intermediate fills in order to save money. In some instances, the customer may negate the need for one or more short fills by getting samples of the medication from the patient's doctor.

Although the preceding text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the following claims.

We claim:

1. A computer readable storage medium storing instructions executable by a processor to perform a method for aligning to a single alignment date refill dates associated with a plurality of prescriptions for a customer, each prescription for a medication, the method comprising:
   receiving a selection of a plurality of prescriptions to align;
   determining with the processor, for each of the plurality of selected prescriptions, a remaining day supply, the remaining day supply indicative of how many days of the medication the customer has remaining;
   determining with the processor a latest adjudication date;
   calculating with the processor a final alignment date;
   determining with the processor, for each of the plurality of selected prescriptions, whether an intermediate fill is required so that the customer does not exhaust the remaining day supply of the medication before the final alignment date;
   calculating with the processor one or both of an intermediate-fill day supply and an intermediate-fill quantity for any prescription requiring an intermediate fill;
   determining with the processor a type for any required intermediate fill;
   causing any required intermediate fill to be filled and provided to the customer, based on either the intermediate-fill quantity or the intermediate-fill day supply for the prescription; and
   causing each of the selected prescriptions to be filled.

2. The computer readable medium of claim 1, wherein calculating a final alignment date further comprises complying with at least one adjudication rule set by a third-party payor.

3. The computer readable medium of claim 2, wherein complying with at least one rule set by the third-party payor further comprises:
   calculating, for each of the plurality of selected prescriptions, a next adjudication date;
   selecting as a latest adjudication date, from the plurality of next adjudication dates, the next adjudication date occurring on the latest date;
   calculating an alignment adjudication date; and
   selecting the final alignment date using the alignment adjudication date.

4. The computer readable medium of claim 3, wherein selecting the final alignment date using the alignment adjudication date further comprises adding one or more days to the alignment adjudication date for processing the prescriptions and providing the medications to the customer.

5. The computer readable medium of claim 3, wherein selecting the final alignment date using the alignment adjudication date further comprises adding one or more days to the alignment adjudication date as a patient start buffer.

6. The computer readable medium of claim 3, wherein calculating, for each of the plurality of selected prescriptions, a next adjudication date, further comprises determining a number of days corresponding to a percentage of a prescribed day supply for the medication.

7. The computer readable medium of claim 1, further comprising:

determining, for any prescription requiring an intermediate fill, a date by which the customer will receive the intermediate fill; and wherein the date by which the customer will receive an intermediate fill for a particular prescription is used to calculate one or both of the intermediate-fill quantity and the intermediate-fill day supply of medication corresponding to the particular prescription if the customer will receive the intermediate fill for the particular prescription before exhausting the remaining day supply of the medication.

8. The computer readable medium of claim 7, wherein determining, for any prescription requiring an intermediate fill, a date by which the customer will receive the intermediate fill, further comprises adding one or more days to the next adjudication date for the prescription for processing the prescription and providing the medication to the customer.

9. A system for aligning to a single alignment date refill dates associated with a plurality of prescriptions for a customer, each prescription for a medication, the system comprising:
   a network;
   a computer coupled to the network;
   a database coupled to the computer; and
   an alignment engine for determining parameters associated with the alignment of the plurality of prescriptions, the alignment engine configured to:
   receive a selection of a plurality of prescriptions to align;
   determine a latest adjudication date;
   calculate a final alignment date; and
   calculate an intermediate-fill parameter.

10. The system of claim 9, wherein the alignment engine is further configured to determine a latest adjudication date, from a plurality of calculated next adjudication dates, in compliance with a rule determined by a third-party payor or a regulatory agency.

11. The system of claim 10, wherein the alignment engine is further configured to:
   retrieve information from the database; and
   calculate a parameter required to determine compliance with the rule determined by the third-party payor or the regulatory agency.

12. The system of claim 11, wherein the rule comprises an adjudication rule and wherein calculating a parameter required to determine compliance with the rule comprises calculating a percent-consumption period.

13. The system of claim 11, wherein calculating an intermediate-fill parameter comprises one of the group consisting of:
   calculating an intermediate-fill day supply;
   calculating an intermediate-fill quantity; and
   calculating an intermediate-fill delivery date.

14. A computer readable storage medium storing instructions executable by a processor to perform a method for aligning to a single alignment date refill dates associated with a plurality of prescriptions for a customer, each prescription for a medication, the method comprising:
   receiving a selection of a plurality of prescriptions to align;
   determining with the processor, for each of the plurality of selected prescriptions, a remaining day supply, the remaining day supply indicative of how many days of medication the customer has remaining;
   determining with the processor a latest adjudication date;
   receiving a selection of a final alignment date;
   determining with the processor, for each of the plurality of selected prescriptions, whether an intermediate fill is required so that the customer does not exhaust the remaining day supply of the medication before the final alignment date;
   calculating with the processor one or both of an intermediate-fill day supply and an intermediate-fill quantity for any prescription requiring an intermediate fill;
   causing any required intermediate fill to be filled and provided to the customer, based on either the intermediate-fill quantity or the intermediate-fill day supply for any prescription; and
   causing each of the selected prescriptions to be filled.

15. The computer readable medium of claim 14, wherein receiving a selection of a final alignment date further comprises limiting the selection to dates on or after an earliest final alignment date.

16. The computer readable medium of claim 15, wherein the earliest final alignment date complies with at least one adjudication rule set by a third-party payor.

17. The computer readable medium of claim 16, wherein complying with at least one rule set by the third-party payor further comprises:
   calculating, for each of the plurality of selected prescriptions, a next adjudication date;
   selecting as a latest adjudication date, from the plurality of next adjudication dates, the next adjudication date occurring on the latest date; and
   calculating the earliest final alignment date using the latest adjudication date.

18. The computer readable medium of claim 17, wherein calculating the earliest final alignment date using the latest adjudication date further comprises adding one or more days to the latest adjudication date for processing the prescriptions and providing the medications to the customer.

19. The computer readable medium of claim 17, wherein calculating, for each of the plurality of selected prescriptions, a next adjudication date, further comprises determining a number of days corresponding to a percentage of a prescribed day supply for the medication.

20. The computer readable medium of claim 14, further comprising:
   determining, for any prescription requiring an intermediate fill, a date by which the customer will receive the intermediate fill; and
   wherein the date by which the customer will receive an intermediate fill for a particular prescription is used to calculate the intermediate-fill quantity of medication corresponding to the particular prescription if the customer will receive the intermediate fill for the particular prescription before exhausting the remaining day supply of the medication.

* * * * *